United States Patent [19]

Mizoguchi

[11] Patent Number: 5,467,195
[45] Date of Patent: Nov. 14, 1995

[54] DENSITY ADJUSTMENT IN AN IMAGE PROCESSING APPARATUS

[75] Inventor: Yoshito Mizoguchi, Yokohama, Japan

[73] Assignee: Canon Kabushiki Kaisha, Tokyo, Japan

[21] Appl. No.: 360,119

[22] Filed: Dec. 20, 1994

Related U.S. Application Data

[63] Continuation of Ser. No. 799,545, Nov. 27, 1991, abandoned.

[30] Foreign Application Priority Data

Nov. 28, 1990 [JP] Japan ................................ 2-322472

[51] Int. Cl.$^6$ ................ H04N 1/23; H04N 1/56; G06K 9/46; G03G 21/00
[52] U.S. Cl. ............... 358/296; 358/300; 358/504; 355/208; 382/168
[58] Field of Search ...................... 358/296, 300, 358/456, 458, 462, 504, 530; 355/208, 214; 346/153.1; 382/17, 18

[56] References Cited

U.S. PATENT DOCUMENTS

| | | | |
|---|---|---|---|
| 4,352,553 | 10/1982 | Hirahara | 355/14 E |
| 4,958,219 | 9/1990 | Kadowaki | 358/75 |
| 5,053,888 | 10/1991 | Nomura | 358/456 X |
| 5,091,967 | 2/1992 | Ohsawa | 358/458 X |
| 5,189,441 | 2/1993 | Fukui et al. | 358/300 X |
| 5,206,686 | 4/1993 | Fukui et al. | 355/208 |

Primary Examiner—Peter S. Wong
Assistant Examiner—Eric Frahm
Attorney, Agent, or Firm—Fitzpatrick, Cella, Harper & Scinto

[57] ABSTRACT

An image forming apparatus has a producing device for producing density information from an original image signal, an image forming device for effecting image formation, and a controlling device for controlling an image formation condition based on the density information of the producing device and the image formation density of the image forming device. The density information is obtained as a frequency distribution of output level of the producing device.

12 Claims, 16 Drawing Sheets

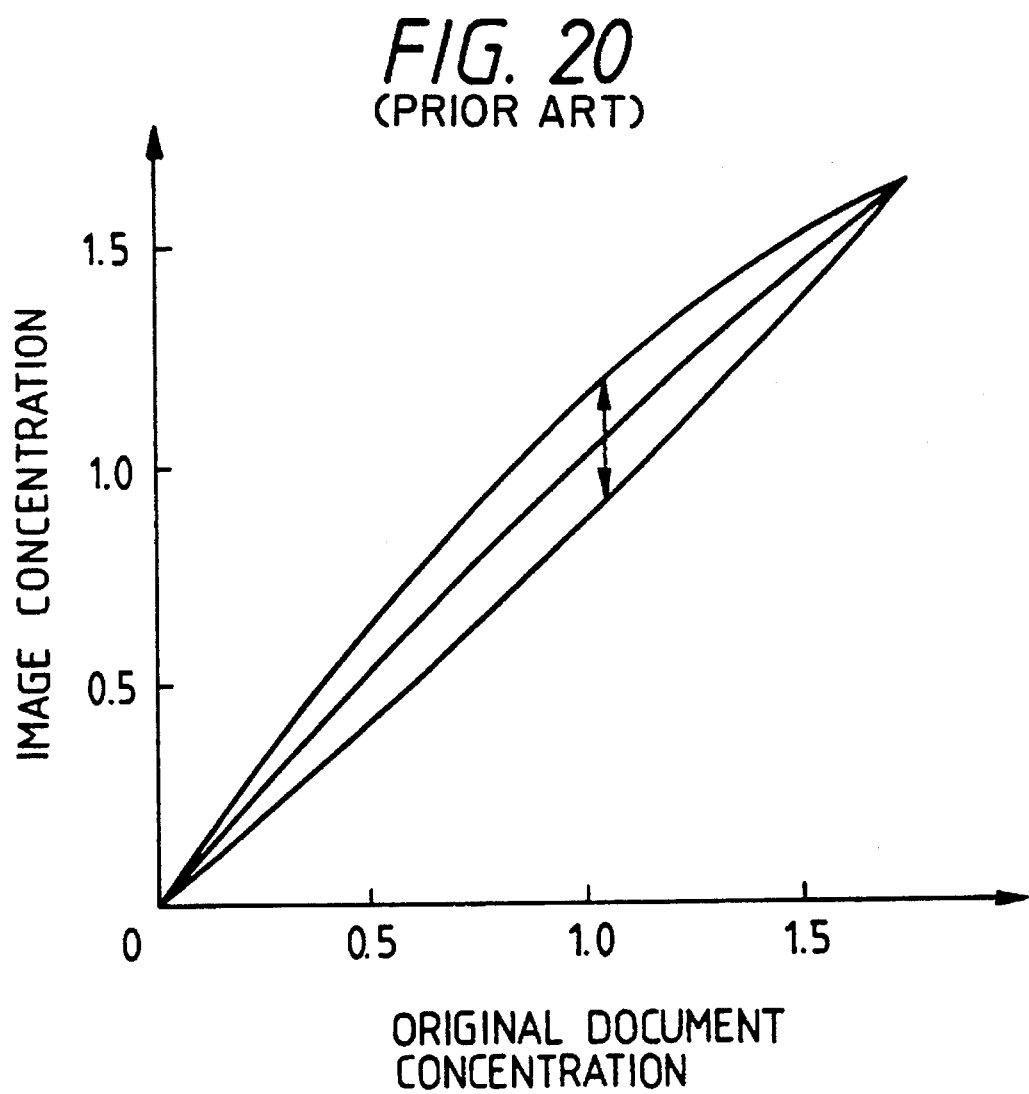

DENSITY ADJUSTMENT IN AN IMAGE PROCESSING APPARATUS

This application is a continuation of application Ser. No. 07/799,545 filed Nov. 27, 1991, now abandoned.

BACKGROUND OF THE INVENTION

1. Field of the Invention

The present invention is related to an image processing apparatus, and more specifically, to an image forming apparatus applicable to a copier of electrophotography type to faithfully reproduce a half tone region.

2. Related Background Art

A laser beam printer is a well-known example of conventional apparatus of such type. There exists a laser beam printer which may effect gradation reproduction by using the pulse duration (or width) modulation of image signal with a reference signal, e.g., a triangle wave signal, and then using the obtained pulse duration for the laser radiation time.

Full color images have been increasing in offices as well as in the fields of printing and designing. Following this trend, getting popular is a color copier which may faithfully read and reproduce a color original. The laser beam printer using the pulse duration modulation as described is also applied to the color copier to faithfully reproduce a color tone. The reproduction of half tone becomes more important than in the common black-and-white copier.

FIG. 14 is a block diagram to show a conventional image forming apparatus. The conventional image density control is explained below referring to FIG. 14.

This is an example of laser beam printer, in which an image is formed by laser beam scanning on a photosensitive drum in synchronization with reading of an original.

A CCD 1 reads an original 9 to obtain an analog image signal. This analog signal is amplified up to a predetermined level by an amplifier 2. The amplified signal is converted by an A/D converter 3 into a digital image signal of eight bits, i.e., 0 to 255 gradations. The digital image signal then passes through a gamma converter 10, which consists of a 256 byte RAM and effects digital conversion in a form of the lookup table, to perform the gamma control. After the gamma control in the converter 10, the signal is input into a D/A converter 14.

The digital signal is converted again into an analog signal. This analog signal is compared at a comparator 16 with a signal of a determined period generated by a triangle wave generation circuit 15 to receive the pulse-width modulation. The binary image signal after the pulse-width modulation is input directly into a laser drive circuit 17, and is then used as a signal to control the radiation of a laser diode 18. The laser radiation from the laser diode 18 is scanned by a well-known polygon mirror 19 in a primary scan direction, passes an f/θ lens 20 and a reflection mirror 21, and is impinged upon a photosensitive drum 22 of image carrier revolving in the direction of arrow as shown to form an electrostatic latent image thereon.

The drum 22 is uniformly discharged by an exposing device 28 and then uniformly charged with negative charge by a charger 23. After the charging, the drum 22 receives the laser radiation to form thereon the electrostatic latent image in correspondence with the image signal. The development is conducted by the so-called image scan method often used in the laser beam printer, in which a portion to be developed, or black pixel, is exposed. Thus a developer 24, using the well-known reversal development, supplies toner having negative charge property onto the portion of the photosensitive drum 22 which has been irradiated by the laser beam, to form a real image.

FIG. 15 shows a relation between the surface potential on the drum 22 and the development contrast upon the reversal development. $V_D$ represents a negative potential uniformly charged by the charger 23 as shown in FIG. 14, $V_{00}$ a surface potential on the photosensitive drum when a digital image signal of $00_{Hex}$, level 0, given by the A/D converter 3 drives the laser to irradiate the drum 22, and $V_{FF}$ the surface potential by a digital signal of $FF_{Hex}$, level 256. If a development bias $V_{DEV}$ is applied onto the developer 24 as shown in FIG. 14, the development is effected under the development contrast of $|V_{DEV}-V_{XX}|$ as shown in FIG. 15.

Supposing the contrast $|V_{DEV}-V_{FF}|$ is a proper contrast potential ($V_{cont}$) and the development density is $D_{max}$ for the development under $V_{cont}$, suitable adjustment of $V_{cont}$ leads to a preferable image density, generally between 1.2 and 1.8 for the electrophotography.

In FIG. 15, the potential ($V_{back}$) is for completely removing fog on a white background of image irradiated by $00_H$ light quantity.

The developed image or negatively charged toner image formed on the photosensitive drum by the above method is transferred onto a transfer medium, usually a paper, 26 by a transfer charger 25. The residual toner on the drum 22 is scratched off by a cleaner 27. The sequential processes are then repeated.

The conventional image density control in the above-described laser beam printer employs the following two controls in order to obtain a linear image density for the digital image signal of 0 to 255.

One is a potential control to gain the proper contrast potential $V_{cont}$ defining the maximum density $D_{max}$ corresponding to the digital image signal of $FF_{Hex}$. The other is a gradation control using the gamma converter to control the half tone density corresponding to the digital image signals of $00_{Hex}$ to $FF_{Hex}$.

The potential and the gradation controls are described below.

The potential control is first explained with reference to FIG. 16.

In FIG. 16, the abscissa represents a grid bias potential of a primary charger and the ordinate a surface charge potential of the OPC photosensitive drum. The unrepresented primary wire is under the constant current control. The line $V_D$ in FIG. 16 shows a charge potential of the photosensitive drum against the grid bias. The line $V_{00}$ shows reduction of potential when the light quantity of $00_{Hex}$ is irradiated at each point on the line $V_D$. Similarly, the line $V_{FF}$ shows reduction of potential when the light quantity of $FF_{Hex}$ is irradiated. The linearity of lines will be held after long use of the photosensitive drum.

Using the above property, the grid bias may be uniquely determined so that the value ($V_{00}-V_{FF}$) is equated with the value ($V_{cont}+V_{back}$) as shown in FIG. 15.

Such potential control may correct the difference in sensitivity property of the photosensitive drum among different manufacturing lets and the deterioration of charge capacity with time to always provide a constant $V_{cont}$.

The conventional gradation control is explained next referring to FIGS. 17, 18, and 19.

FIG. 17 shows an output image density against the digital image data of 0 to 255 without gradation correction. This property is not linear as known, but an S-shaped curve.

The function of the curve may be linearized by multiplying an inverse function thereof. That is, the inverse function as shown in FIG. 18 can be applied. FIG. 18 is normalized by 0 to 255. The inverse function of FIG. 18 is stored as conversion coefficients in the gamma converter as shown in FIG. 19. The digital image signal is converted in a manner as seen in FIG. 19.

The above gradation control may correct and linearize the function of nonlinear electrophotographic property of FIG. 17.

However, since the above conventional example uses $V_{cont}$ defining the output maximum density for the potential control, the density of half tone can vary under the identical maximum density as seen in FIG. 20. This may occur even if the above-described gradation control is used, as explained below.

There is a method proposed to control the maximum density and the gradation linearity by making changeable, if necessary, $V_{cont}$ and the conversion coefficients in response to variable factors in electrophotography. The maximum density shows one-to-one correspondence to the development contrast secured on the photosensitive drum by the light quantity $FF_{Hex}$, so that it may be controlled. It is, however, very difficult to control the gradation or half-tone density because of difficulty to detect and control all variable factors as explained below. Thus such problem that the half-tone density may change under the identical maximum density remains unsolved.

The major variable factors in electrophotography are as follows.

The first factor is an environment dependency, for example, a change in sensitivity property of the photosensitive drum depending on the humidity.

The second is a durability dependency, for example, a change in sensitivity property of the photosensitive drum due to abrasion of the drum.

The third is a distribution of machine performance, for example, a change in laser light quantity property for $00_{Hex}$ to $FF_{Hex}$ within a range of distribution of laser units.

As explained before, $V_{cont}$ and the conversion coefficients of the gamma conversion could be made variable to correct the variable factors. It is, however, more difficult actually to control the gradation to be linear than to control $D_{max}$ to be constant.

It should also be noted that the visual sensitivity is generally high at the half tone area rather than at the high density portion. Consequently the gradation change rather than the $D_{max}$ change shows great influence on change in quality of image. If the linearity of gradation is broken by some of the above reasons, such a problem remains unsolved that the preferable gradation or color reproduction cannot be attained, for example, by a copier necessitating especially high gradation reproducibility and by a full color copier requiring high color reproducibility.

U.S. Pat. No. 4,352,553 (Hirahara) discloses a technique to control the image forming conditions directly from the frequency distribution of density of original image. This technique fails to attain the optimum control, missing the correlation between the original density and the image forming density.

SUMMARY OF THE INVENTION

A purpose of the present invention is, in consideration of the above-described points, to provide an image forming apparatus enabling proper gradation and color reproduction.

In an embodiment of the present invention image forming means is controlled based both on density information of an original image and on an output density of the image forming means.

Another embodiment of the present invention is an image forming apparatus to form a visible image on an image carrier, which comprises producing means for producing density information of image of an original, counting means for receiving an output of said producing means to obtain a frequency distribution of level of said output image forming means for forming an image, detecting means for detecting an image forming density of said image forming means, and control means for controlling an image forming condition based on a density level corresponding to the output level determined from the frequency distribution and the output of the detection means. In the present invention the image forming condition is controlled at the density level corresponding to the output level determined based on the frequency distribution.

Other purposes of the present invention will be clarified by the following detailed description and drawings.

BRIEF DESCRIPTION OF THE DRAWINGS

FIG. 20 is a drawing to show a relation between an original image density and an image density in the conventional technique.

DETAILED DESCRIPTION OF THE PREFERRED EMBODIMENTS

Embodiment 1

Figure 1:
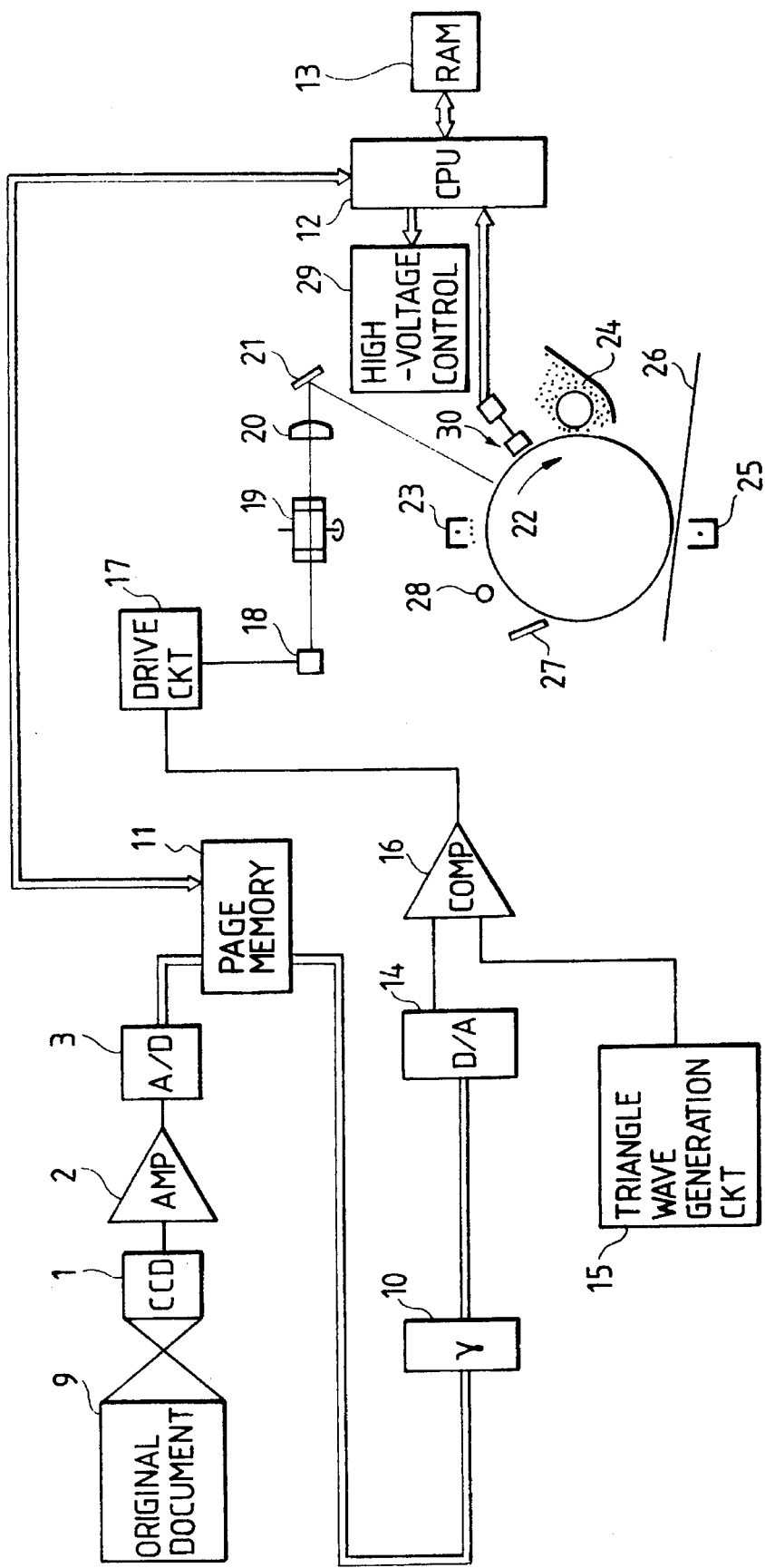
FIG. 1 is a block diagram to show an embodiment of the present invention.
Figure 14:
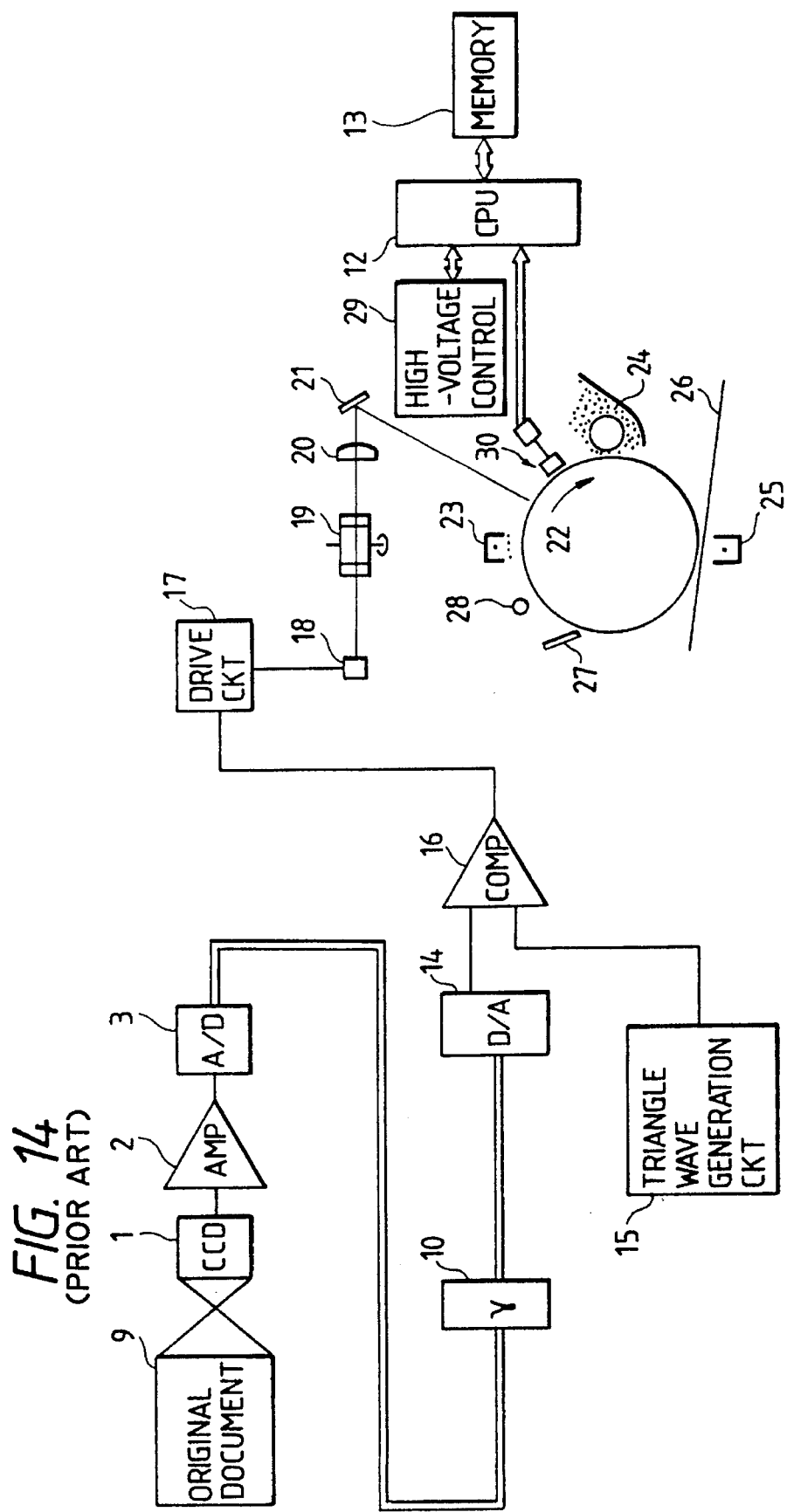
FIG. 14 is a drawing to illustrate a conventional technique.
Figure 15:
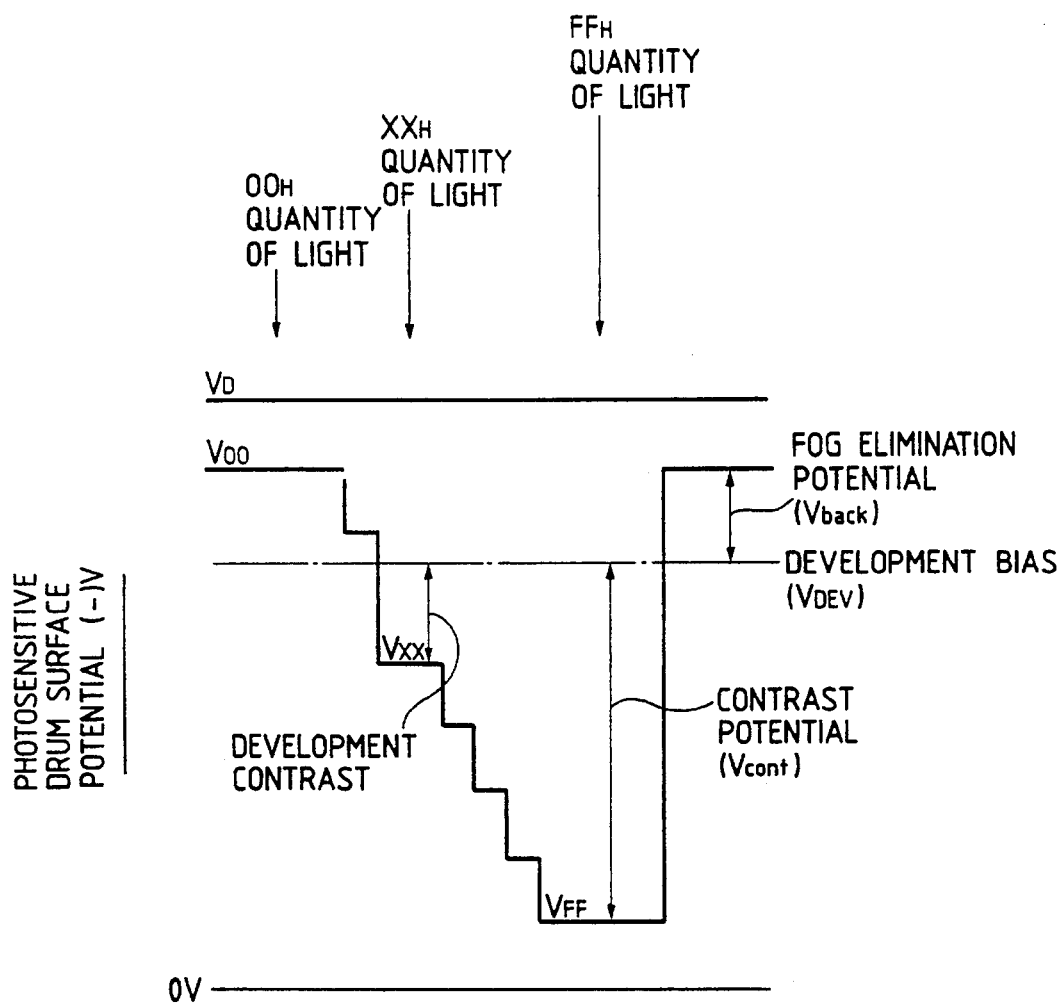
FIG. 15 is a drawing to illustrate a relation between a photosensitive drum surface potential and a development contrast.

FIG. 1 is a block diagram to show the first embodiment of the present invention. Components with the same functions as those in FIG. 14 are given the same numbers and omitted to explain.

In FIG. 1, 11 denotes a page memory to store digital data after reading an original. The page memory 11 is controlled by CPU 12 to transfer the data either to the CPU 12 or to the gamma converter 10. 13 is a RAM to store an operation result of CPU 12 and to draw data out of the CPU 12 when necessary.

Figure 2:
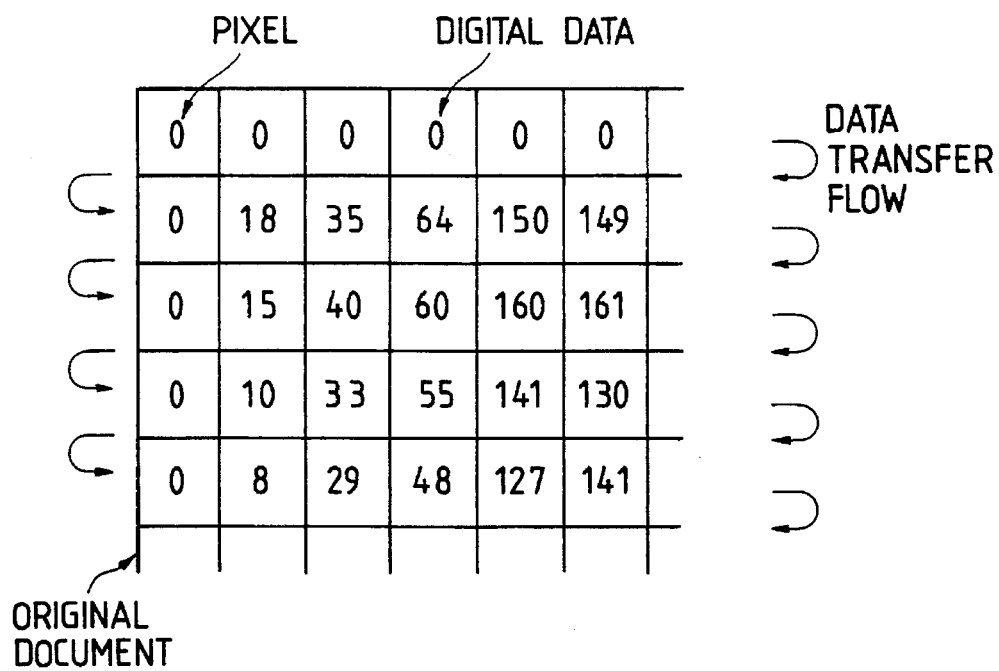
FIG. 2 is a schematic drawing to show a density distribution of original by pixel unit.

The page memory 11 stores in pixel unit the digital data of original read by the CCD sensor 1. The digital image data is, for example, shown for each pixel in FIG. 2. In this example data is written with eight bits in the address for each pixel on the page memory 11 in the order of arrows in FIG. 2.

Figure 3:
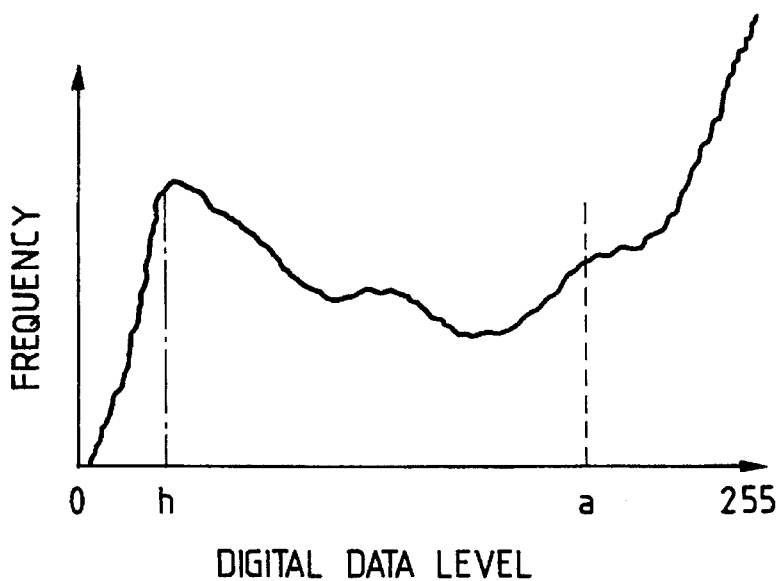
FIG. 3 is a drawing to show a frequency against a CCD output level.
Figure 4:
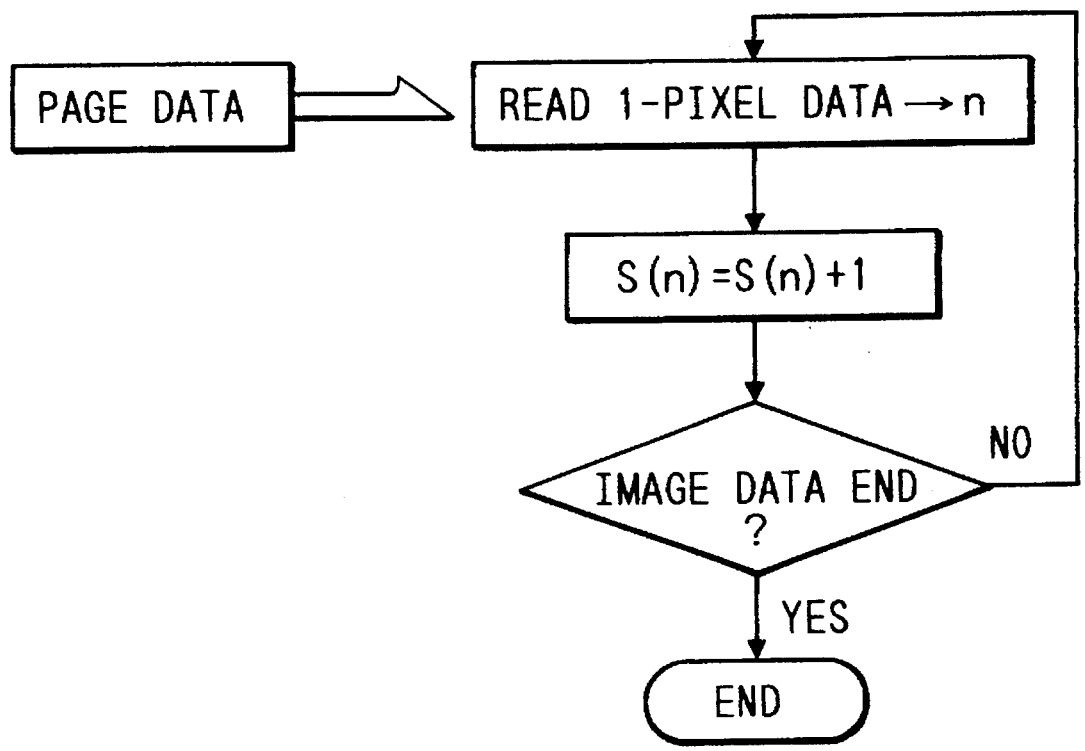
FIG. 4 is a flow chart to show a process for making a frequency distribution.

Then the CPU 12 reads the data to form a histogram of the image data as shown in FIG. 3. Following an operation process in FIG. 4, the frequency of the n-th level of each digital data of 0 to 255 is counted to be S(n). The RAM 13 is used as a memory with necessity. The final frequency distribution S(n) is also stored in the RAM 13.

The CPU 12 obtains the digital data level of maximum frequency of the histogram as shown in FIG. 3 with reference to the frequency distribution S(n) stored in the RAM 13. In FIG. 3, the data level h shows the maximum frequency. The levels from a to 255 are excluded from the detection of maximum frequency. It is because such high levels of CCD output correspond to the white background of the original. In the present embodiment $a=192(CO_{Hex})$.

Figure 5:
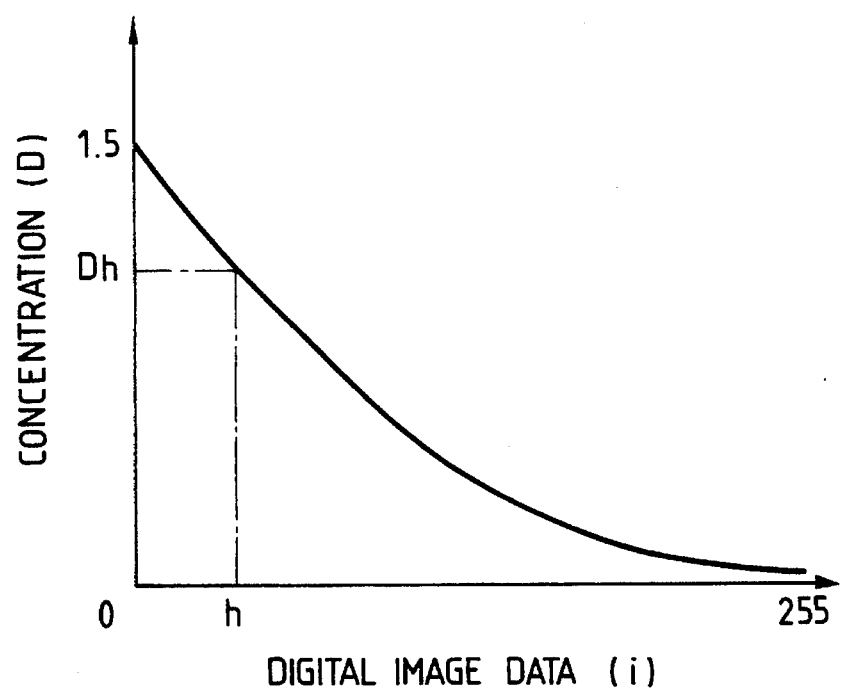
FIG. 5 is a drawing to show a density against a CCD output level.

The maximum frequency level h presents a fact that in the original image density information the density corresponding to the h level of CCD output is most frequency distributed over the original. Further, the CCD sensor 1 is a device with a linear output property against an incident light quantity, providing the following function for the density of level h:

$$Dh = f\left[ -\log\left( \frac{h}{255} \right) \right],$$

which is a function of h. The function of the digital data of CCD output to the density or concentration is shown in FIG. 5.

As seen, the density Dh is most frequently distributed in the density information of the original image. Consequently, it can be judged that an image forming condition is effectively controlled at the level h. Namely, the faithful reproduction of the density Dh is advantageous to acquire an image with high reproducibility.

Explained blow is a method to determine the image forming condition at the level h of the digital data, referring to FIG. 1.

Figure 6:
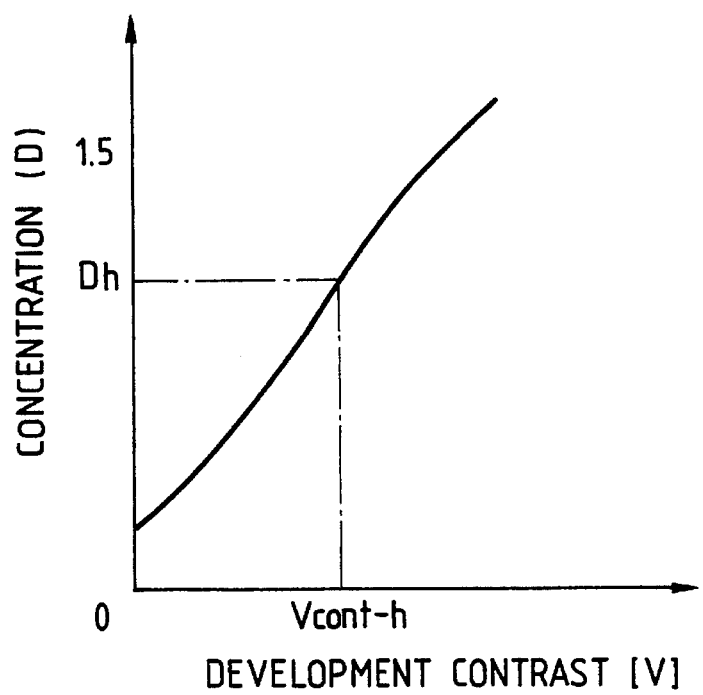
FIG. 6 is a drawing to show a density against a development contrast.

The CPU 12 determines the development contrast necessary for the density Dh. FIG. 6 shows a relation between the development contrast of the density. The RAM 13 stores this relation and the CPU 12 computes the development contrast $V_{cont}$ –h for the density Dh with reference to the stored relation.

In summary, before the control of image forming condition the development contrast $V_{cont}$ –h is obtained in response to the digital image signal of the level h. The control of image forming condition is followed.

In FIG. 1, 30 denotes a probe of potentiometer for the surface potential, which is positioned close to the surface of the photosensitive drum 22 after exposure of laser beam and which detects the potential of latent image upon surface potential control. The detected potential thereby is converted into a digital signal, which is input into the CPU 12. The CPU 12 performs operation following an algorithm as explained below, and then outputs a signal to a high-voltage control unit 29 to determine the image forming condition.

Figure 7:
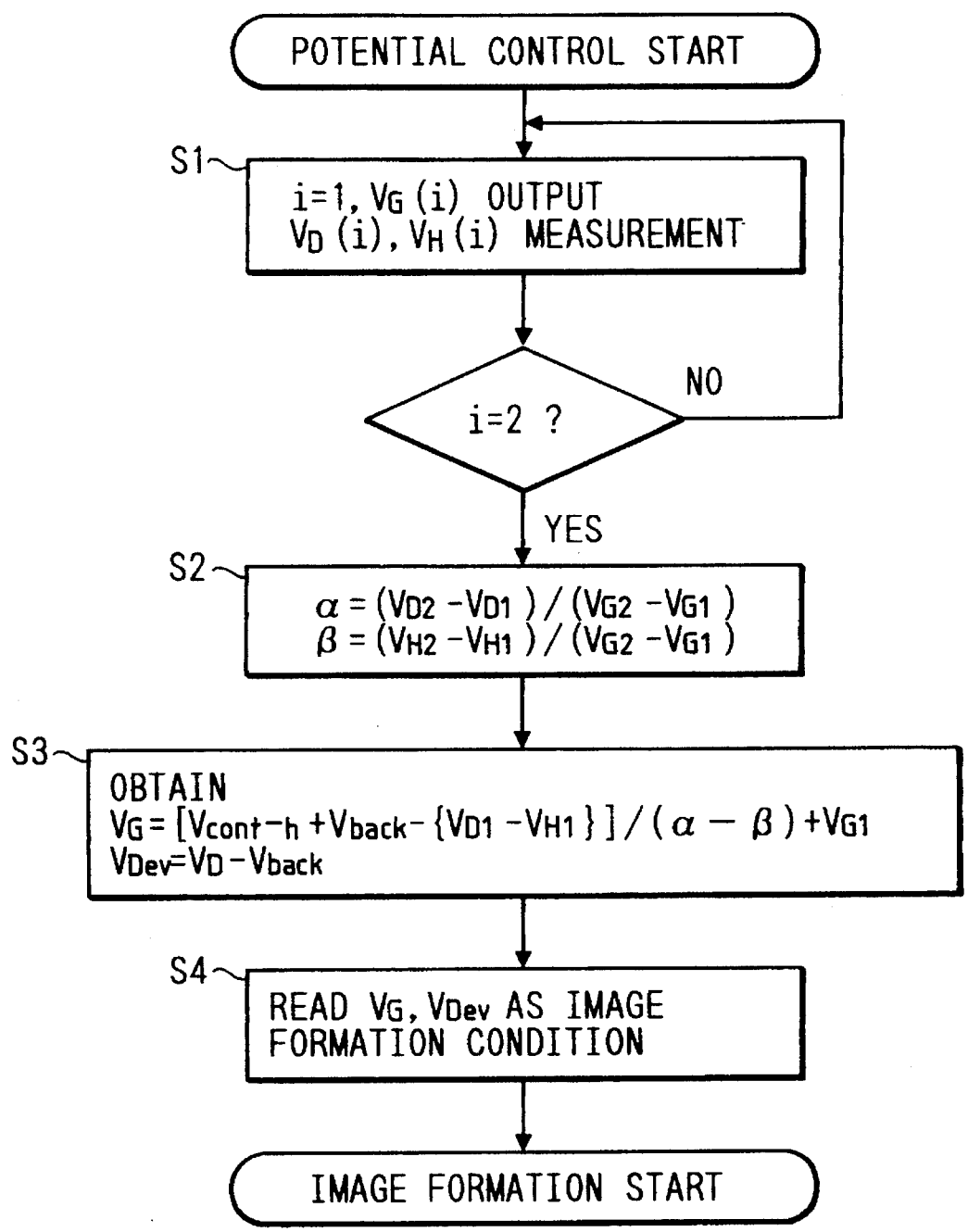
FIG. 7 is a flow chart to show a process for controlling a potential.

The algorithm for potential control is now explained referring to FIG. 7.

In step S1, measurement is conducted of potential $V_{D(i)}$ of a dark portion of the photosensitive drum while changing the grid bias $V_{G(i)}$, where i=1, 2, and of potential $V_{H(i)}$ upon laser exposure corresponding to the image data of level h, which represents the half tone.

In step S2, computed are a change rate $\alpha$ of $V_D$ per $V_G$ and a change rate $\beta$ of $V_H$ per $V_G$ from preliminary obtained relations between $V_G$ and $V_D$ and between $V_G$ and $V_H$.

Figure 16:
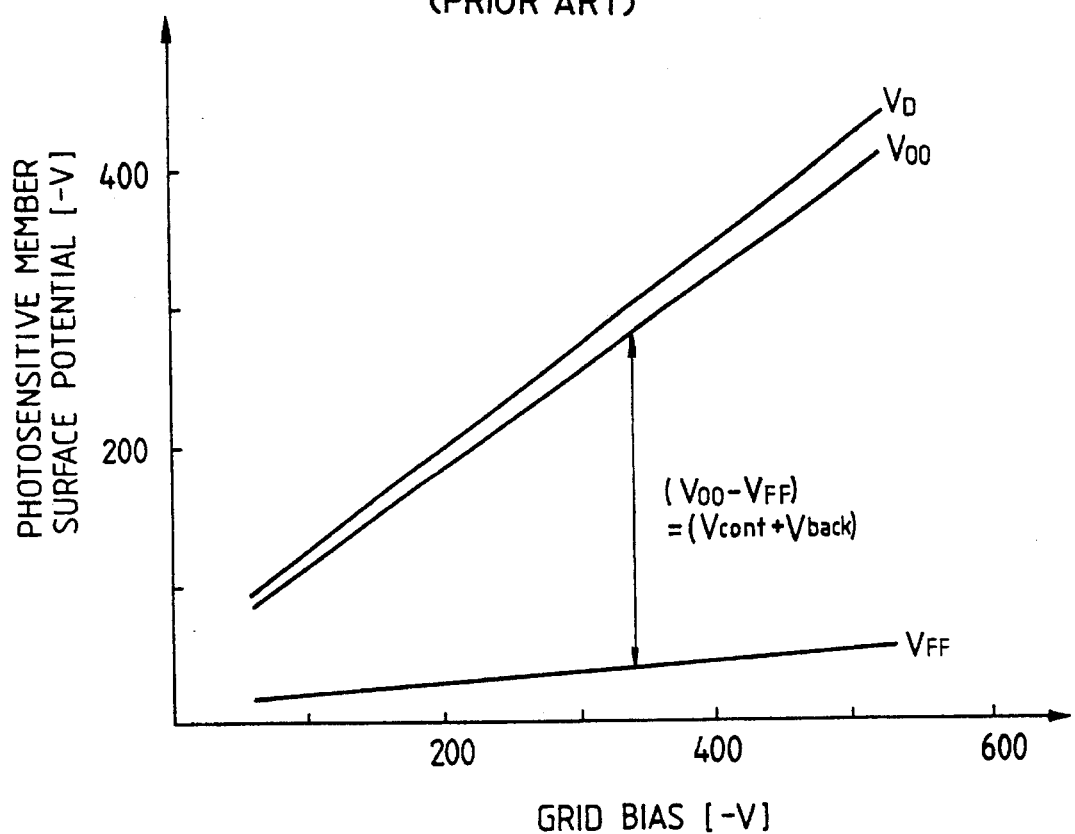
FIG. 16 is a drawing to show a charge property and an exposure property of OPC photosensitive member.
Figure 17:
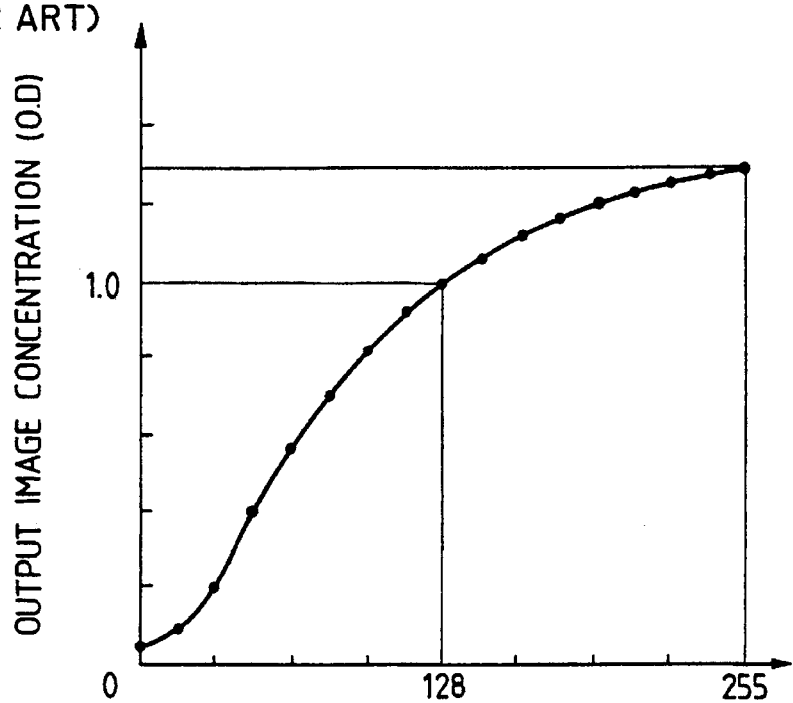
FIG. 17 is a drawing to show an electrophotographic property without gamma control.
Figure 18:
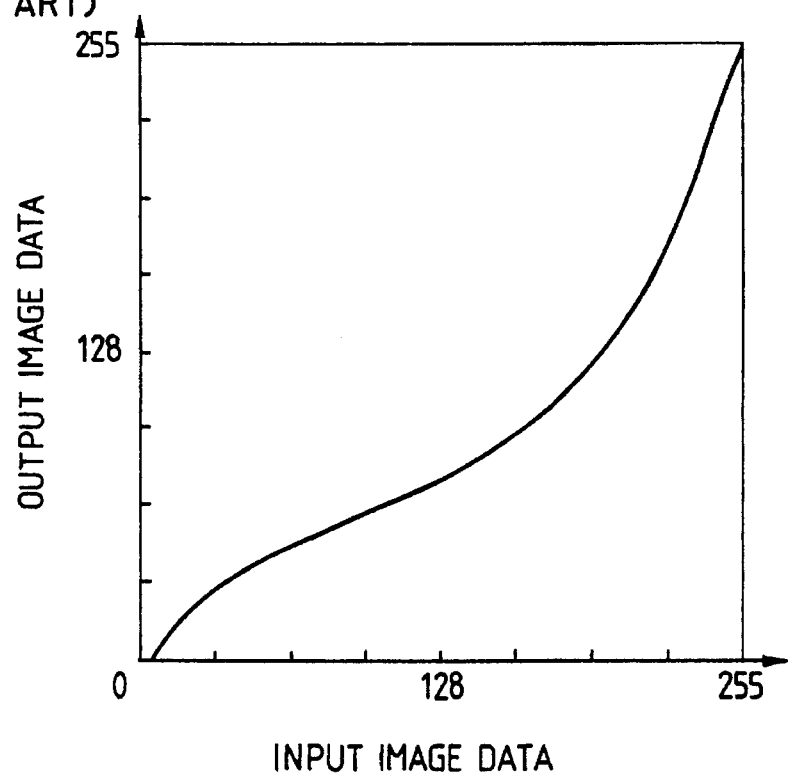
FIG. 18 is a drawing to show gamma conversion coefficients.
Figure 19:
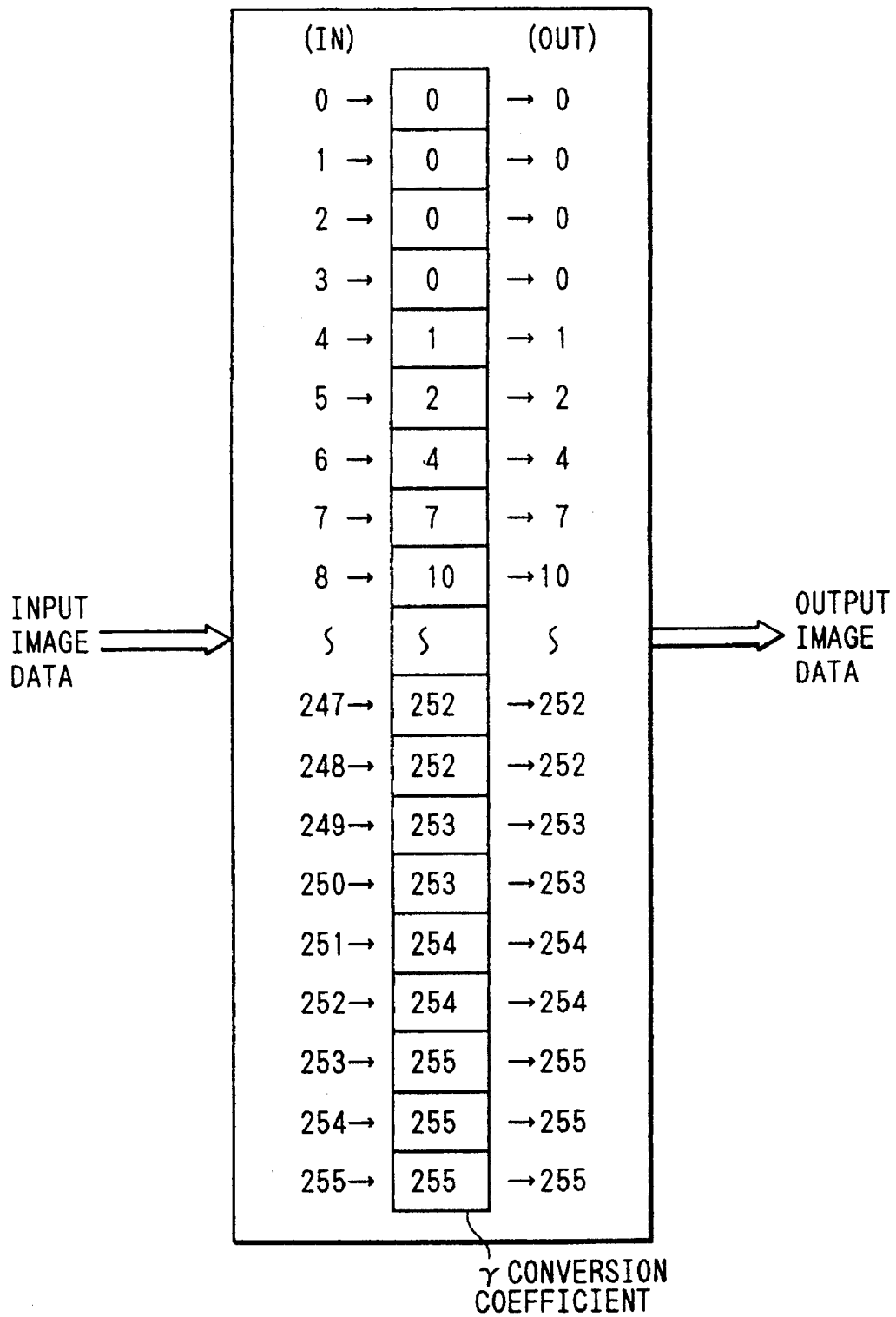
FIG. 19 is a drawing to show a manner of gamma conversion.

As explained before, the relations of $V_G$ with $V_D$ and $V_H$ are linear for the OPC photosensitive member as shown in FIG. 16. The relations are as follows:

$$\alpha = (V_{D2} - V_{D1})/(V_{G2} - V_{G1}) \quad (1);$$

$$\beta = (V_{H2} - V_{H1})/(V_{G2} - V_{G1}) \quad (2).$$

From the above equations (1) and (2), the relations of $V_G$ with $V_D$ and $V_H$ are obtained as the following linear functions in step S2:

$$V_D = \alpha(V_G - V_{G1}) + V_{D1} \quad (1');$$

$$V_H = \beta(V_G - V_{G1}) + V_{H1} \quad (2'),$$

where $\alpha$, $\beta$ are slops in respective equations.

In step S3, as explained before, the grid bias is so determined that $(V_D - V_H)$ becomes the sum of the necessary development contrast $V_{cont}$–h and the fog elimination potential $V_{back}$. Namely, $V_D$, $V_H$ of (1'), (2') are put into the following relation:

$$V_D - V_H = V_{cont} - h + V_{back} \quad (3).$$

Then $V_G$ may be calculated as follows:

$$V_G = \frac{(V_{cont} - h + V_{back}) - (V_{D1} - V_{H1})}{\alpha - \beta} + V_{G1}. \quad (4)$$

This $V_G$ is put into the equation (1') to determine $V_D$. The development bias $V_{DEV}$ is determined as before, i.e., $$V_{DeV} = V_D - V_{back} \quad (5).$$

In step S4, $V_G$ and $V_{DeV}$ in step S3 are read out as the image formation condition to perform the process of image formation based on these values. The page memory 11 is controlled by the CPU 12 to send data to the gamma converter 10.

In the present embodiment, the grid bias potential $V_G$ is changed at the first step of control sequence to measure the dark portion potential $V_D$ and the half tone potential $V_H$. It would be more preferable for compensation for an accidental case such as a pin hole at the potential measurement position of the photosensitive member and electric noises, to perform the operation based on data obtained after plural measurements at different positions on the photosensitive member under the same process condition and elimination of abnormal data of surface potential. An example of such data processing is a method to omit the maximum and the minimum of plural measurement data and take an average of the remaining data.

Although the present embodiment shows an example that the grid bias is changed within two points, further change more than two may be processed similarly.

Figure 8:
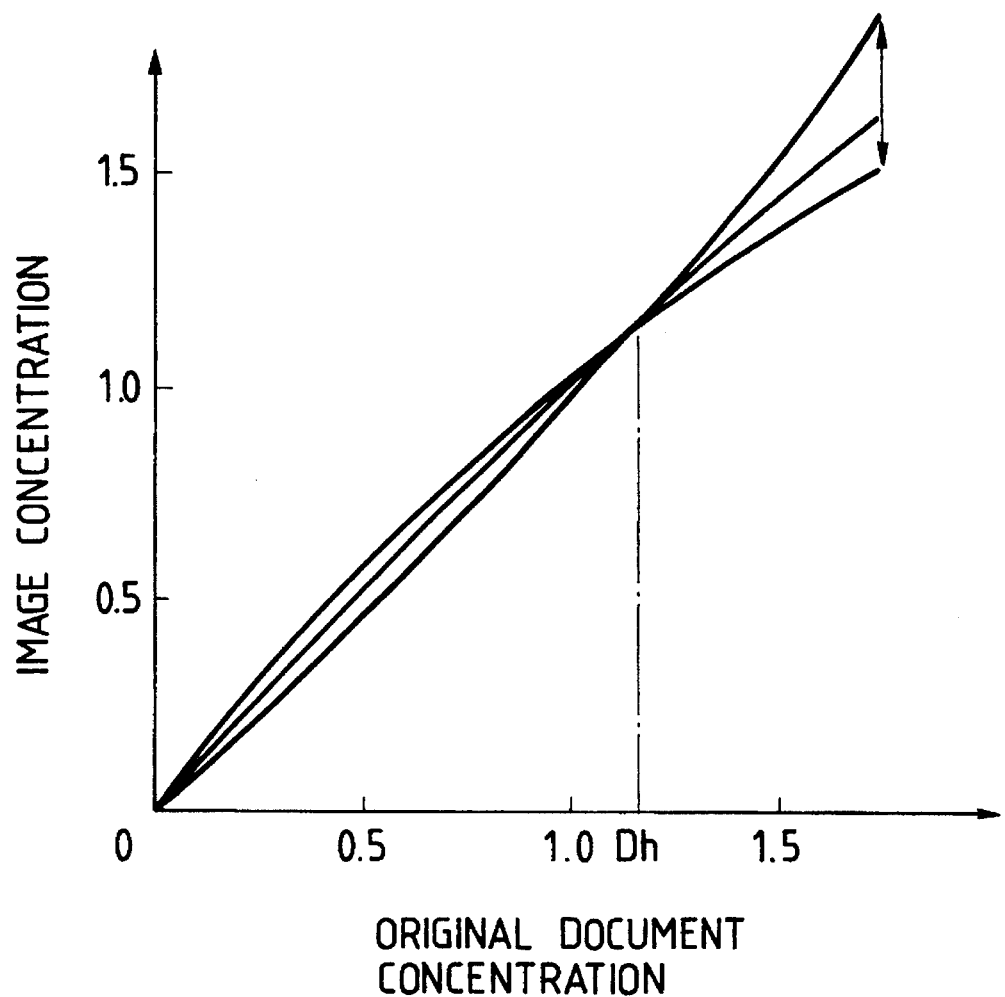
FIG. 8 is a drawing to show a relation between an original density and an image density in the first embodiment.

FIG. 8 shows a result showing a relation of output density to the original density in use of the image forming apparatus with the above-described structure to actually produce a copy of original. It is clear compared with FIG. 20 that variation of gradation reproduction is made smaller in the half tone region. In other words an image is obtained with high reproducibility in the half tone region, where the eye sensitivity is high.

Embodiment 2

Another embodiment of the present invention is explained next.

Figure 9:
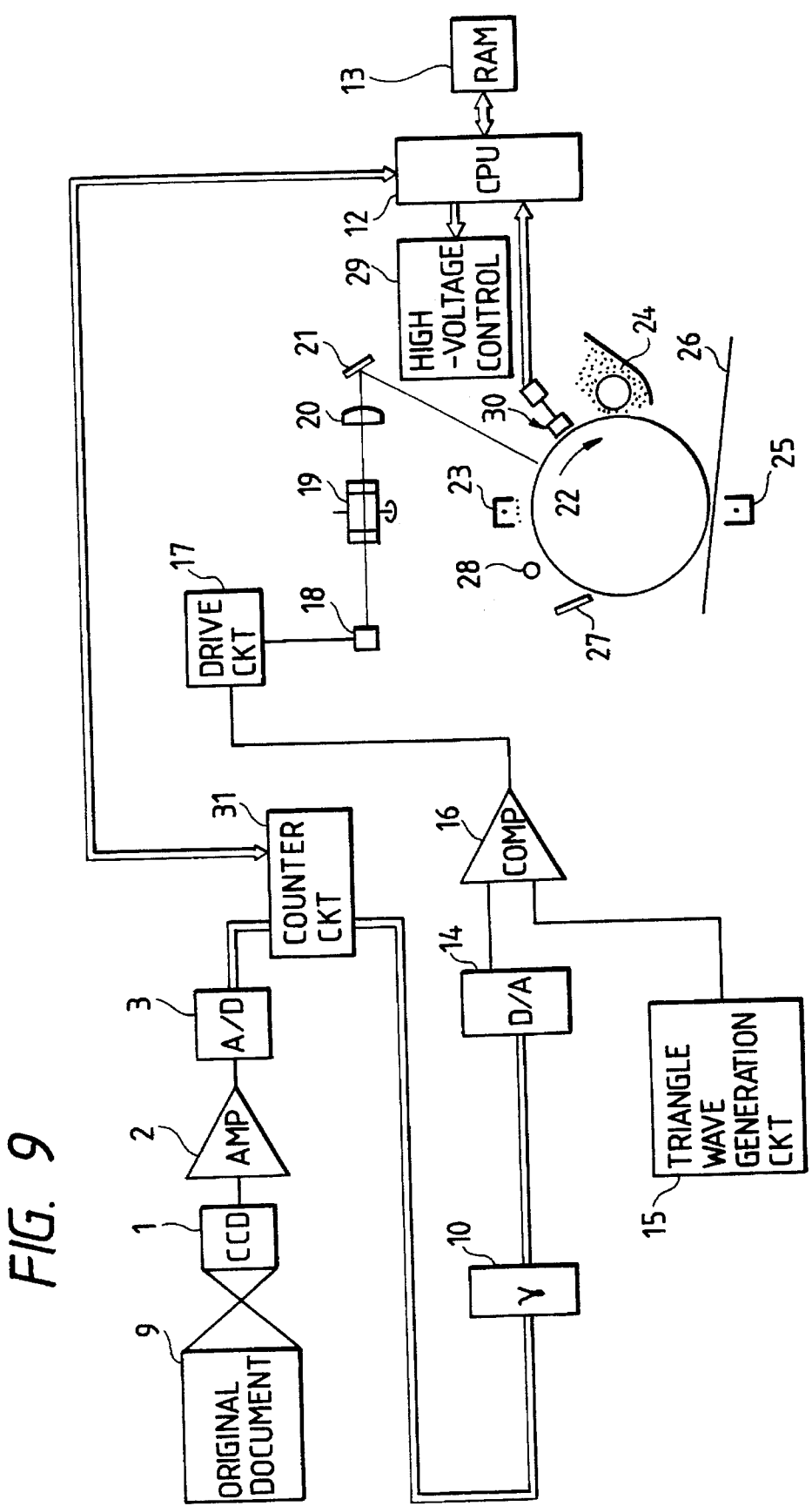
FIG. 9 is a block diagram to show the second embodiment of the present invention.

FIG. 9, is a block diagram to show the second embodiment of the present invention.

Figure 10:
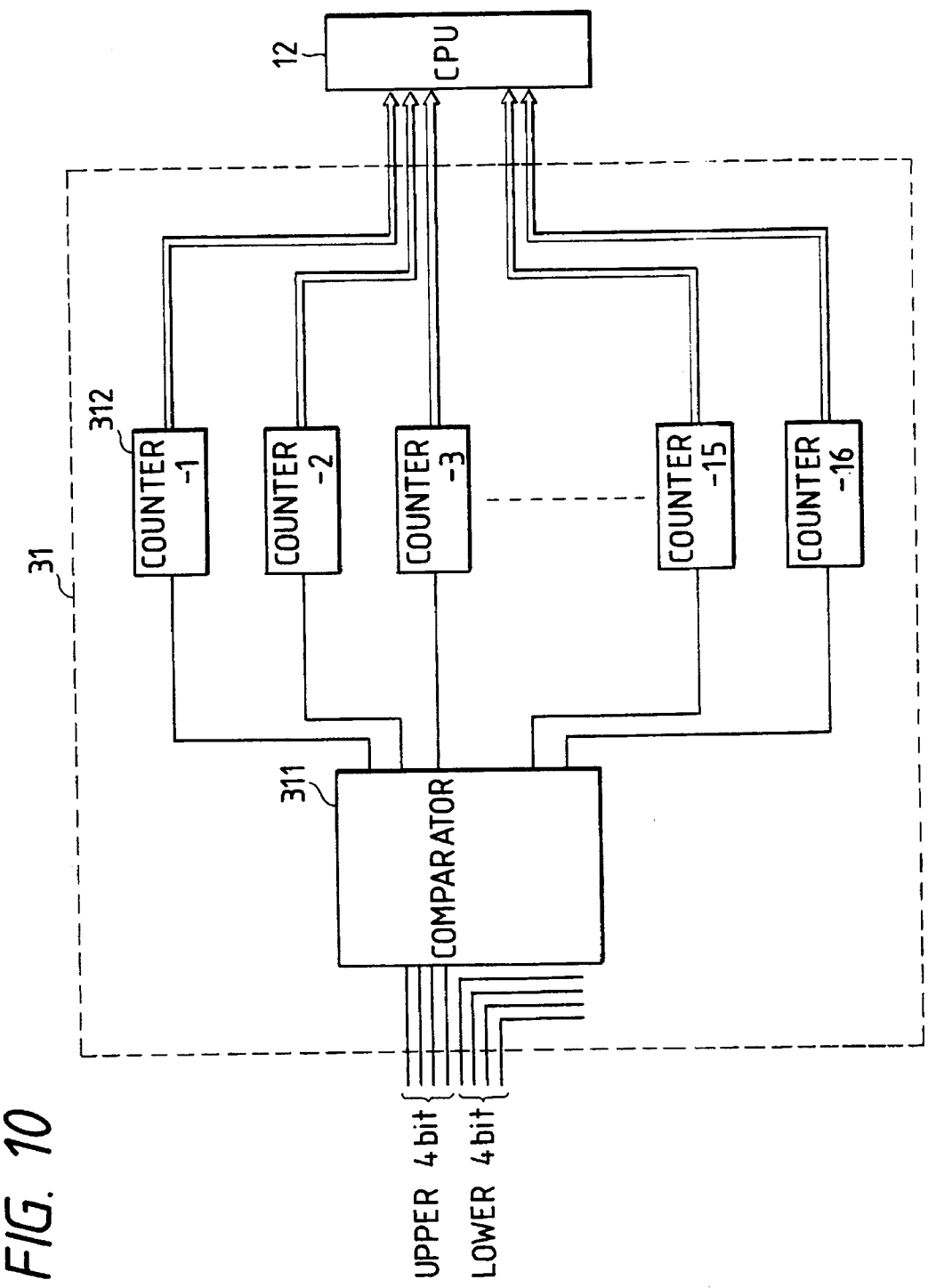
FIG. 10 is a circuit diagram to show a detail structure of a counter circuit.

In FIG. 9, 31 is a counter circuit and other components are structured as in FIG. 1. While the frequency is counted for each level of digital data in the first embodiment, sixteen levels, for example, of 0 to 15, 16 to 31 . . . , and 240 to 255 are employed to count the frequency in the present embodiment. FIG. 10 shows a structure of the counter circuit 31.

The counter circuit operates as follows.

Although eight bit data is sent to the counter circuit 31, only the upper four bits are input into the circuit 31 omitting the unnecessary lower four bits. In the drawing 311 denotes a comparator to discriminate the data of upper four bits between 0 to 15, and then to send an ON signal to either of sixteen counters 312. The counters 312 start counting in response to the ON signal.

The frequency for each of sixteen levels is counted from the CCD output of density information of original image. After reading the original, CPU 12 controls the counter circuit 31 to transfer the frequency of each of sixteen levels to the CPU 12.

Figure 11:
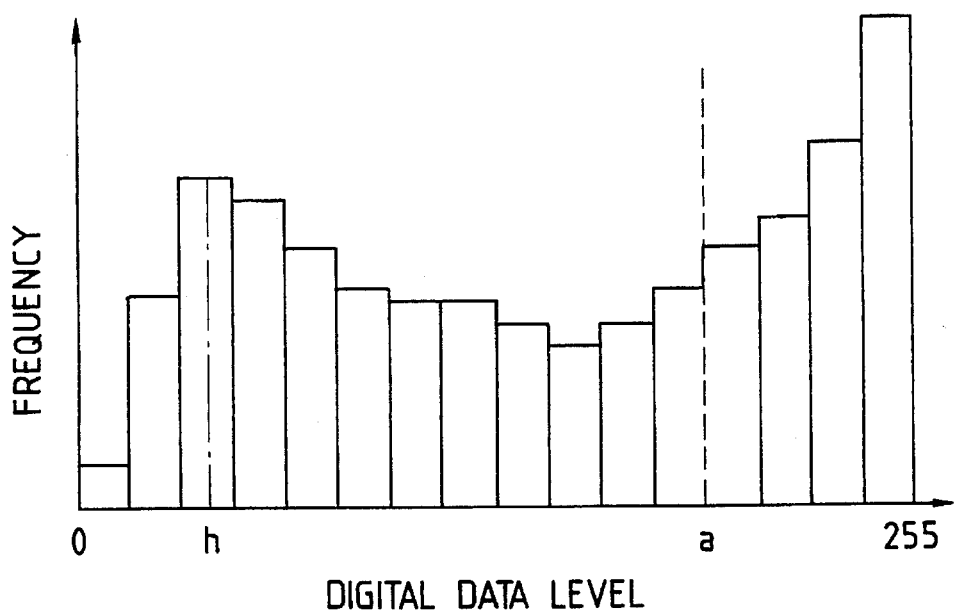
FIG. 11 is a drawing to show a frequency against a CCD output level.

FIG. 11 shows a histogram of frequency distribution of the second embodiment. If the maximum frequency is given at a digital data level h, the following process would be identical to that in the first embodiment.

Since the present embodiment does not have to use such an expensive page memory as the first embodiment, this embodiment has an advantage of cost reduction while keeping the high quality of image with good half tone reproduction comparable to the first embodiment.

Embodiment 3

The next embodiment shows an example of color image forming apparatus. The image forming apparatus of the third embodiment is structured to adjust that of the first embodiment as shown in FIG. 1.

Only the difference from the first embodiment is that the developer 24 is changed into a developer of four colors, i.e., yellow, magenta, cyan, and black, that the CCD 1 is changed into a CCD enable to read a color image, and that a color signal processing circuit is added. Other components are referred to the first embodiment, and omitted to explain.

An image of original is read into the CPU similarly as in the first embodiment, with a color separation filter being positioned before the CCD to read color components of the original. Also similarly to the first embodiment, the frequency distribution of the CCD output for each color of red, green, and blue is formed as shown in FIG. 12.

Figure 13:
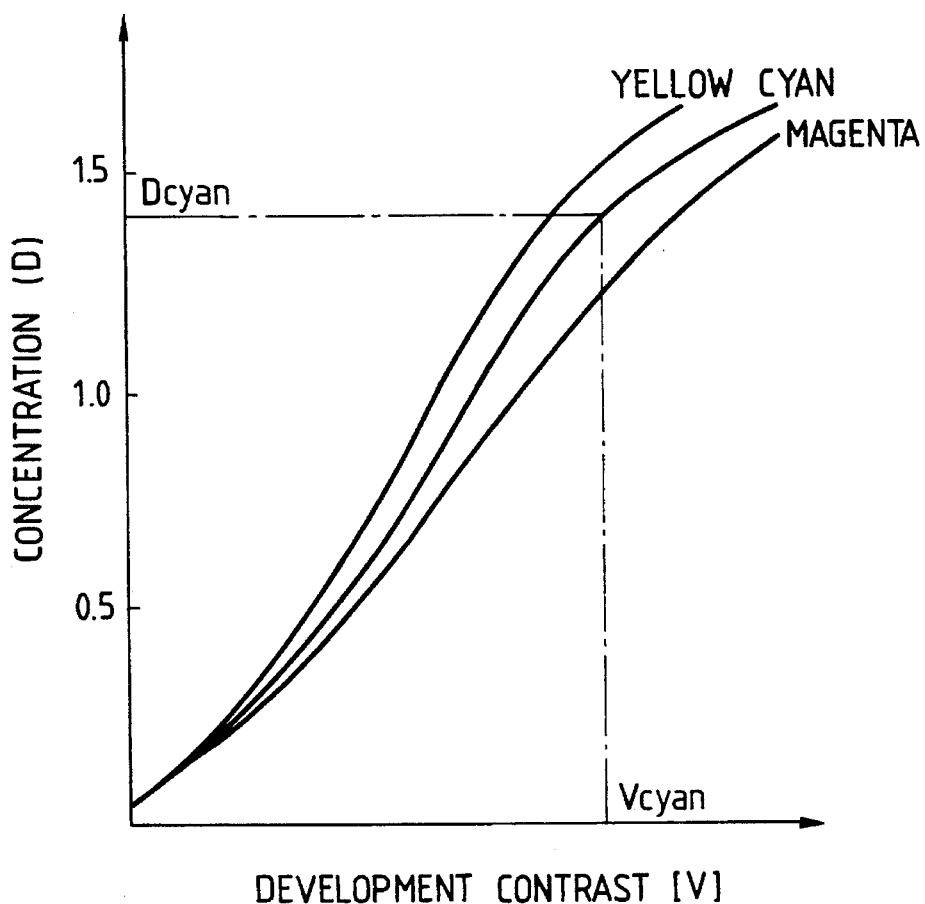
FIG. 13 is a drawing to show a density against a development contrast of each color of cyan, magenta, and yellow.
Figure 12:
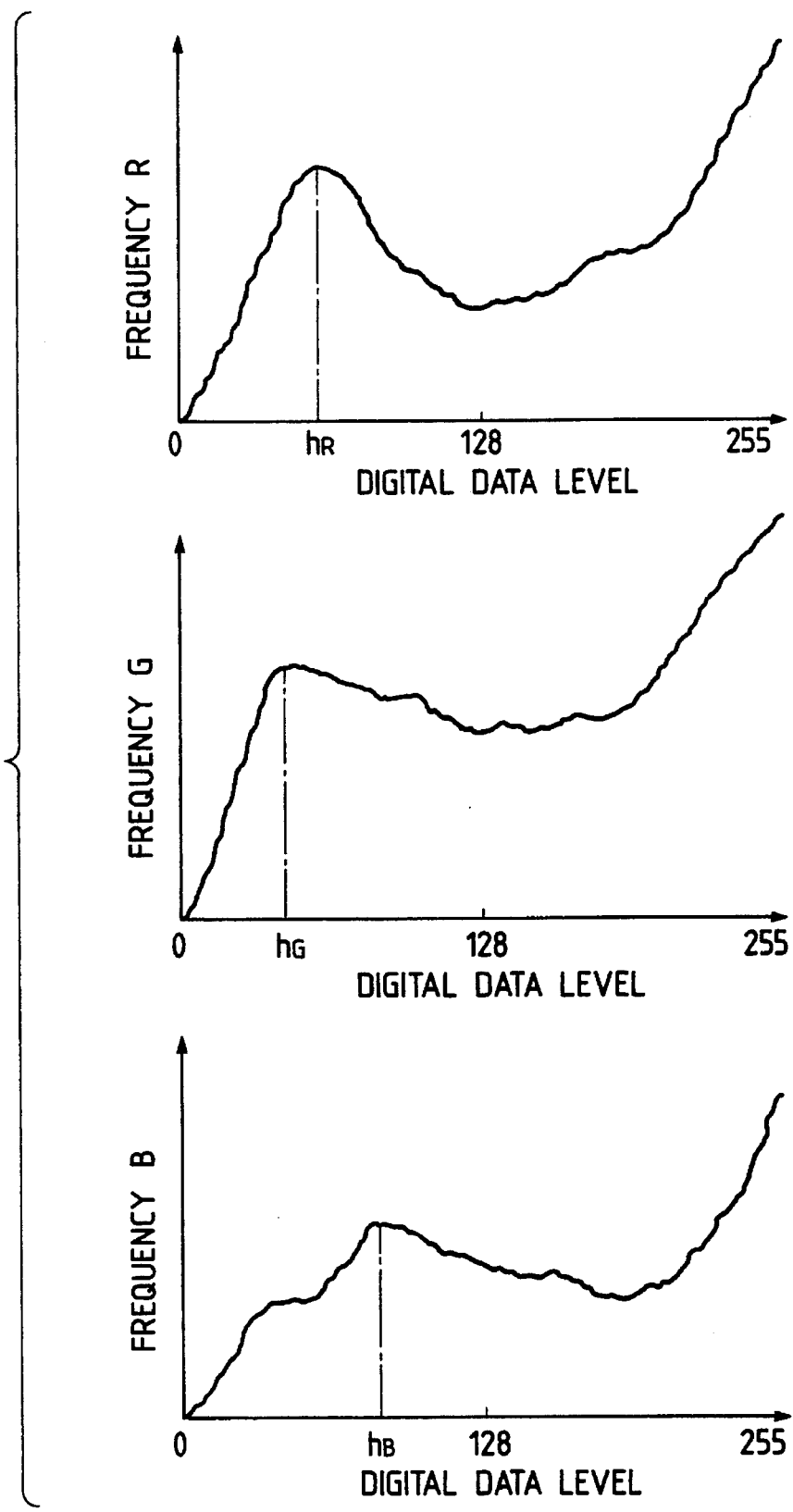
FIG. 12 is a drawing to show a frequency against a CCD output level of each color of red, green, and blue in case of color original.

As seen in FIG. 12, digital data levels $h_R$, $h_G$, and $h_B$ of CCD output are obtained at respective maximum frequencies of red, green, and blue. It is a common proceed to for a color image, to repeat development of cyan, magenta, yellow, and if necessary black. The cyan development is effected based on the signal of red which is a complementary color of cyan. Before the development, $h_R$ is converted into a cyan density $D_{cyan}$. Referring to the development property of cyan as shown in FIG. 13, a development contrast $V_{cyan}$ is determined. Then, the potential control is achieved by $V_{cyan}$ following that of the first embodiment.

Similarly, the development contrast $V_{magenta}$, $V_{yellow}$ are obtained from the development properties in FIG. 13 before each development, and the potential control is then effected based on each of $V_{magenta}$ and $V_{yellow}$.

The above-described method provides a color image with excellent color reproduction, especially of a color most frequently distributed over an original. Since a color component of grey is expected to appear most frequently in a color original in case of $h_R \geq h_G \geq h_B$, the average of $h_R$, $h_G$, and $h_B$, i.e., $$h_{ave} = \frac{(h_R + h_G + h_B)}{3}$$

may be employed to obtain a density $D_{ave}$ as a target density of cyan, magenta, and yellow, providing an image excellent in grey balance.

In the above embodiments of image forming apparatus of the present invention the grid bias potential $V_G$ and the development bias potential $V_{DEV}$ are controlled. The same process may be applied to the control of laser intensity, charge current of the primary charger 23, grid bias potential, and development bias potential by controlling the drive of the laser control unit 17 and the high voltage control unit 29.

As explained above, the present invention attained the arrangement in which a density level corresponding to a maximum frequency is determined by analyzing density information of an image of an original and an image forming condition is controlled at the density level. This arrangement allowed to obtain an image with high reproducibility of area of high visual sensitivity on the original, i.e., in the half tone region.

Consequently, the present invention is suitably applicable to an image forming apparatus requiring faithful reproduction of half tone and to a color image forming apparatus necessitating high color reproducibility.

Furthermore, copiers according to the present invention provide an excellent copy of a copy of original, presenting a small difference in density or color between the second generation copy and the original.

The present invention is not limited by the above embodiments and may be modified within a range of claims as claimed.

For example, the present invention is applicable to an image forming apparatus such as a thermal printer and an ink jet printer as well as to electrophotographic copiers. In such case the density may be detected by a photoreception element and the image forming condition may be controlled by the recording potential.

What is claimed is:

1. An image forming apparatus comprising:

producing means for producing original density information from an image of an original;

counting means for receiving the original density information from said producing means and for determining a signal level corresponding to a density occurring with a high frequency in a frequency distribution of the original density information;

image forming means for forming an image based on the signal level determined by said counting means;

detecting means for detecting a potential corresponding to an image density of the image formed by said image forming means based on the determined signal level, and for generating an output in accordance with the detected value; and controlling means for controlling an image formation condition based on the output of said detecting means such that the image density is adjusted to a predetermined density which is used to form an image on a recording medium.

2. An image forming apparatus according to claim 1, wherein said signal level determined from the frequency distribution is an output level of maximum frequency out of levels in the frequency distribution excluding high levels corresponding to a white background portion of the original image.

3. An image forming apparatus according to claim 1, wherein said controlling means comprises setting means for setting and changing the image forming condition necessary for image formation, and operation means for computing the image forming condition based on the output of said detecting means and a predetermined value.

4. An image forming apparatus according to claim 1, wherein said image forming means is comprised by means for forming a latent image on a photosensitive member and said detecting means detects a potential of the latent image on said photosensitive member.

5. An image forming apparatus according to claim 4, wherein said controlling means controls a charge potential of said photosensitive member.

6. An image density controlling method, comprising the steps of:

obtaining a density histogram of an original image;

extracting a signal level corresponding to a density occurring with a high frequency in the density histogram;

measuring, after formation of an image having a density corresponding to the extracted signal level by an image formation unit, a potential corresponding to an image density of the image formed by the image formation unit; and changing an image formation condition of the image formation unit, in accordance with the potential measured in said measuring step, to adjust the image density of an image formed with a density corresponding to the extracted signal level to a predetermined image density which is used to form an image on a recording medium.

7. A method according to claim 6, wherein, in said extracting step, a maximum frequency level is extracted from the histogram excluding density levels corresponding to a background portion of the original.

8. A method according to claim 6, wherein, in said measuring step, plural values corresponding to densities are measured at at least two points with respect to the image formation condition, and in said controlling step, the image formation condition is changed in accordance with the plural values corresponding to densities.

9. A method according to claim 6, wherein, in said obtaining step, a histogram is obtained for each of a plurality of color components of an original color image, and in said extracting step, a level having a high frequency is extracted from the histogram for each of the color components.

10. A method according to claim 9, wherein, in said controlling step, the image formation condition of the image formation means is changed in accordance with a value corresponding to an image density of an image formed with a density corresponding to the extracted level, for each color component.

11. An image forming apparatus comprising:

producing means for producing original density information from an image of an original;

counting means for receiving the original density information from said producing means and for determining a signal level corresponding to a density occurring with a high frequency in a frequency distribution of the original density information;

image forming means for forming an image based on the signal level determined by said counting means;

detecting means for detecting an image density of the image formed by said image forming means based on the determined signal level, and for generating an output in accordance with the detected image density; and controlling means for controlling an image formation condition based on the output of said detecting means such that the image density is adjusted to a predetermined density which is used to form an image on a recording medium.

12. An image density controlling method, comprising the steps of:

obtaining a density histogram of an original image;

extracting a signal level corresponding to a density occurring with a high frequency in the density histogram;

measuring, after formation of an image having a density corresponding to the extracted signal level by an image formation unit, an image density of the image formed by the image formation unit; and changing an image formation condition of the image formation unit, in accordance with the image density measured in said measuring step, to adjust the image density of an image formed with a density corresponding to the extracted signal level to a predetermined image density which is used to form an image on a recording medium.

* * * * *

UNITED STATES PATENT AND TRADEMARK OFFICE
CERTIFICATE OF CORRECTION

PATENT NO. : 5,467,195

DATED : November 14, 1995

INVENTOR(S): Yoshito Mizoguchi

It is certified that error appears in the above-identified patent and that said Letters Patent is hereby corrected as shown below:

COLUMN 2:

Line 61, "lets" should read --outlets--.

COLUMN 5:

Line 30, "with necessity" should read --when necessary--;
Line 40, "presents" should read --represents--;
Line 42, "frequency" should read --frequently--; and
Line 62, "blow" should read --below--.

COLUMN 6:

Line 40, "slops" should read --slopes--.

COLUMN 7:

Line 62, "enable" should read --able--.

UNITED STATES PATENT AND TRADEMARK OFFICE
CERTIFICATE OF CORRECTION

PATENT NO. : 5,467,195

DATED : November 14, 1995

INVENTOR(S): Yoshito Mizoguchi

It is certified that error appears in the above-identified patent and that said Letters Patent is hereby corrected as shown below:

COLUMN 8:

Line 6, "proceed to" should read --procedure--; and
Line 23, "$h_R \gtrsim h_G \gtrsim h_B,$" should read --$h_R \simeq h_G \simeq h_B,$--.

Signed and Sealed this

Seventh Day of May, 1996

Attest:

BRUCE LEHMAN

Attesting Officer   Commissioner of Patents and Trademarks